Dec. 5, 1961 F. KOUBEK 3,011,417
DEVICES FOR SWIVELLING THE OBJECTIVE OF PANORAMIC CAMERAS
Filed Aug. 10, 1959 6 Sheets-Sheet 1

INVENTOR.
František Koubek
BY

INVENTOR.
František Koubek

Dec. 5, 1961                F. KOUBEK                3,011,417
        DEVICES FOR SWIVELLING THE OBJECTIVE OF PANORAMIC CAMERAS
Filed Aug. 10, 1959                                6 Sheets-Sheet 3

INVENTOR.
František Koubek
BY

United States Patent Office 3,011,417
Patented Dec. 5, 1961

3,011,417
DEVICES FOR SWIVELLING THE OBJECTIVE OF PANORAMIC CAMERAS
František Koubek, Tritim, Czechoslovakia, assignor to Meopta Prerov, narodni podnik, Prerov, Czechoslovakia
Filed Aug. 10, 1959, Ser. No. 832,542
Claims priority, application Czechoslovakia Aug. 20, 1958
10 Claims. (Cl. 95—16)

The invention relates to devices for swivelling the objective of panoramic cameras designed for taking pictures upon a fixed film.

Devices for swivelling the objective of panoramic cameras are known, the objective of which is turned by a spring in one direction and manually rotated in the other direction, at the same time winding up the spring (U.S. Pat. 624,553). Equally known are devices for turning the objective by a spring whereby the picture is taken during one deviation while the objective is returned by a second manual motion into its initial position where it is ready for a further exposition.

Other known devices for panoramic cameras are so designed that an objective cylinder is turned in one direction and a sensitive film advanced by means of a compound and complicated gear transmission from a spring mechanism or a spring motor (U.S. Pat. No. 2,717,542, U.S. Pat. No. 2,764,073, Swiss Pat. No. 308,913). Other panoramic cameras are provided with a complicated and expensive optical system (Brit. Pat. No. 809,055). All these apparatus are heavy and complicated, so their manipulation when taking a picture is rendered difficult and some of them are limited to taking small size pictures.

The present invention improves the device for swivelling the objective of panoramic cameras by simplifying the mechanism, which runs noiselessly, at the same time perfectly sealing the objective cylinder against the penetration of light. Besides it is possible to design the apparatus also for wide films, considering that the whole device is relatively light and simple from a constructional point of view. Thus it is possible to design the camera for large size pictures more perfectly suitable for enlargements.

The present invention is characterized in that the objective is placed inside a rotatable objective cylinder the front cavity of which is designed as sunshade while the rear cavity contains a shutter consisting of two sectors, the rotation of the objective cylinder being effected by flexible tapes fixed upon the cylinder jacket and wound upon rollers which are rotated in one direction by coil springs.

The invention is illustrated by way of example, upon the accompanying drawings.

Figure 1:
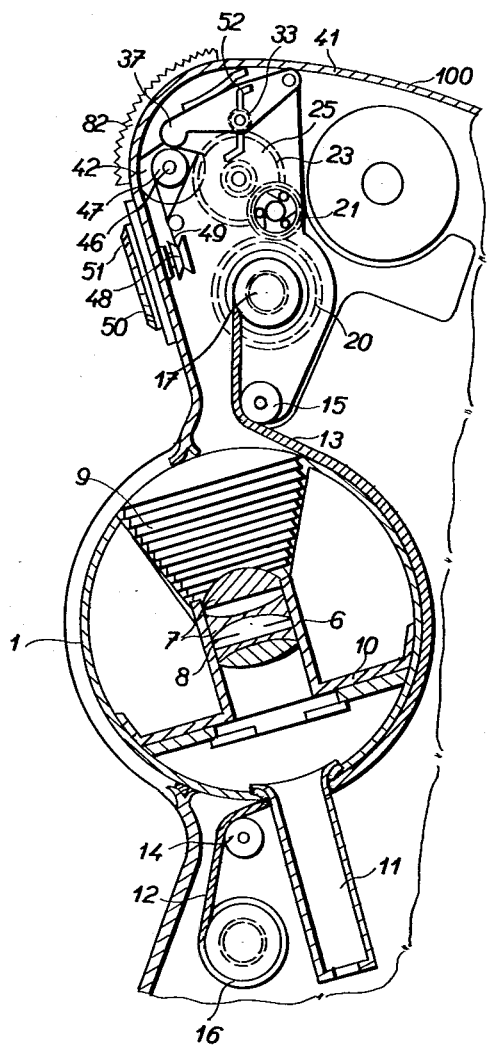
FIG. 1 shows a cross section through a portion of the panoramic camera, in a plane at right angles to the axis of the objective cylinder.
Figure 2:
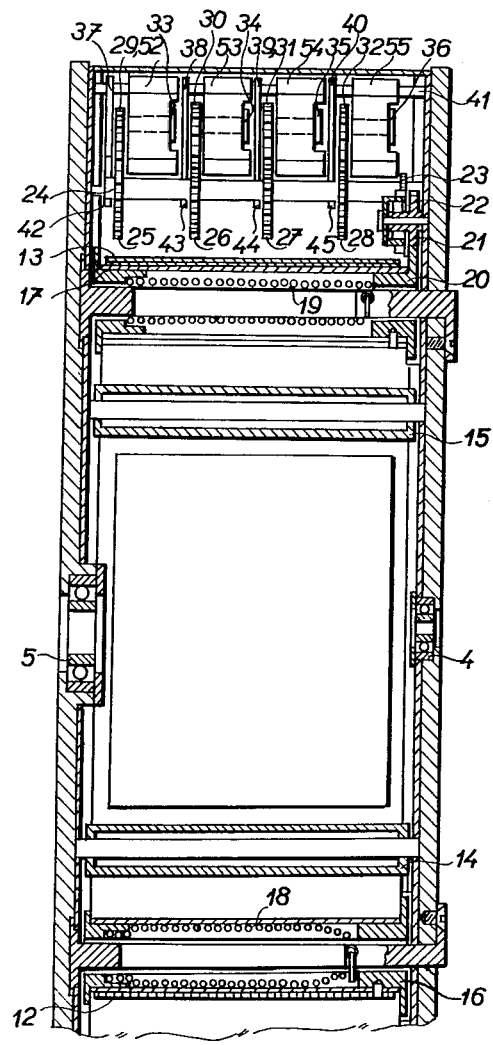
FIG. 2 shows a cross section through a panoramic camera in a plane parallel to the axes of the spring containing tape rollers, the tapes serving for swivelling the objective cylinder, the latter not being shown in this drawing.

The objective cylinder 1 is provided with pins 2 and 3 supported by ball bearings 4 and 5 located in the housing 100 of the camera, the objective 7 is fastened inside the objective mounting 6 of the objective cylinder 1 and is fitted with an iris diaphragm 8. The front part of the mounting 6 is designed as sunshade 9; in the rear part there is the sector shutter 10 and a light tunnel 11. Flexible tapes 12 and 13, fixed at two points of the cylinder jacket, are running over rollers 14 and 15 and are wound upon rollers 16 and 17. Coil springs 18 and 19 arranged inside these rollers serve for driving them. The flexible tapes 12 and 13 render the camera perfectly light-tight. In FIG. 2 details of the speed regulation i.e. of the retarding device are illustrated which consists of a number of fans. These can be caused to enter into action alternatively and are more or less braked by their air resistance, thus regulating the swivelling speed of the objective cylinder in accordance with the dial of knob 50. The roller 17 carries a gear wheel 20 engaging a gear wheel 21 of a unidirectional clutch the second gear 22 engaging the gear 23 located on shaft 24. This shaft carries 4 gears 25, 26, 27 and 28 engaging gears 29, 30, 31 and 32 pivoted on pins 33, 34, 35 and 36 which are fastened to levers 37, 38, 39 and 40 pivoted on a rod 41. The levers 37, 38, 39 and 40 are in contact with the periphery of cams 42, 43, 44 and 45 fixed upon a shaft 46 (FIG. 1) which can be turned by means of rollers 47 and 48 and a small cable 49. The angle of deviation of the shaft 46 is controlled by a knob 50 fitted with a dial which indicates the swivelling speeds of the objective cylinder 1. The fans 52, 53, 54 and 55 supported by the pins 33, 34, 35 and 36 can be made to turn independently or alternatively in mutual combination and correspondingly be braked in their rotation.

A knob 56 fitted upon the pin 3 of the objective cylinder 1 serves for winding up the driving spring 19 mounted inside the roller 17 with the aid of the flexible tape 13. The iris diaphragm 8 of the objective is adjusted by the knob 57 fixed upon a shaft 58 which is provided with a gear wheel 59 engaging a gear 60 located on the shaft 61. A worm 62 mounted on the shaft 61 engages the worm wheel 63 which, in connection with a ring, adjusts the sectors of the iris diaphragm 8. The knob 57 is fitted with a dial indicating the opening of the diaphragm. This knob 57 is arranged coaxially with the knob 56 which serves for winding up the swivelling device of the objective.

Figure 4:
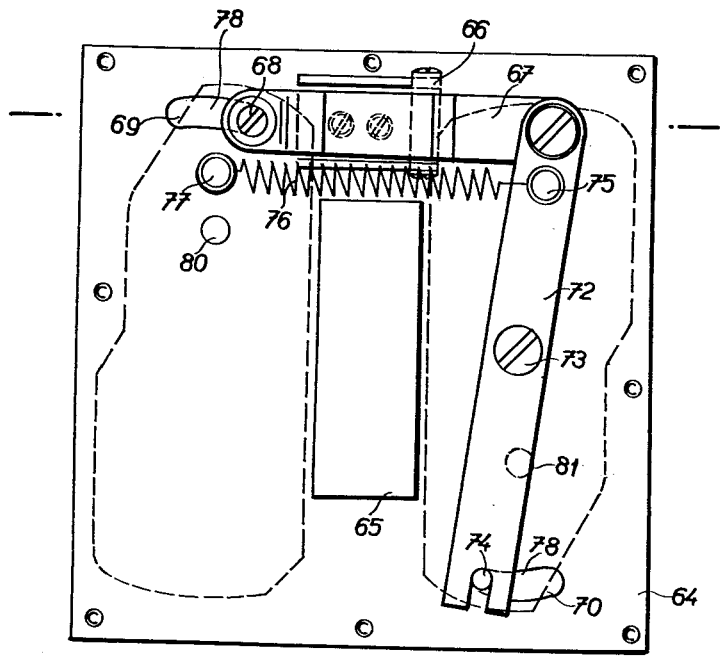
FIG. 4 is a view of the shutter in the open position of the two sectors.
Figure 5:
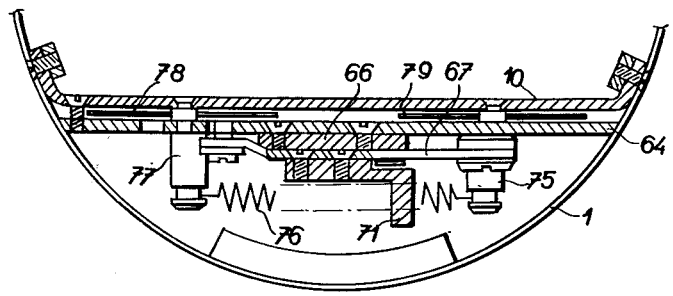
FIG. 5 is a sectional view of the sector type shutter, in the plane A—A of FIG. 5.

The double-sector shutter 10 placed behind the objective 7 is illustrated in detail in the FIGS. 4 and 5. An aperture 65 in the plate 64 fastened to the objective cylinder 1 enables the passing through of light rays. A seat 66 on the upper part of plate 64 supports a rod 67, the pin 68 of which can be displaced in the segment shaped aperture 69 of the plate 64. A stop 71 fastened to the rod 67 serves for controlling the shutter. The other end of the rod 67 is linked to the two-arm lever 72 pivoted on the pin 73. The end of the other arm of the lever 72 is fitted with a fork engaging the pin 74 which is displaced in the segment shaped aperture 70 of the plate 64. There is a pin 75 upon the lever 72 which catches the end of the coil spring 76 the other end of which is suspended upon a pin 77 secured to the plate 64. The spring 76 pulls the two-arm lever 72 in one direction, thus the shutter is kept closed. The pins 68 and 74 are fastened to the sectors 78 and 79 pivoted on pins 80 and 81.

Figure 6:
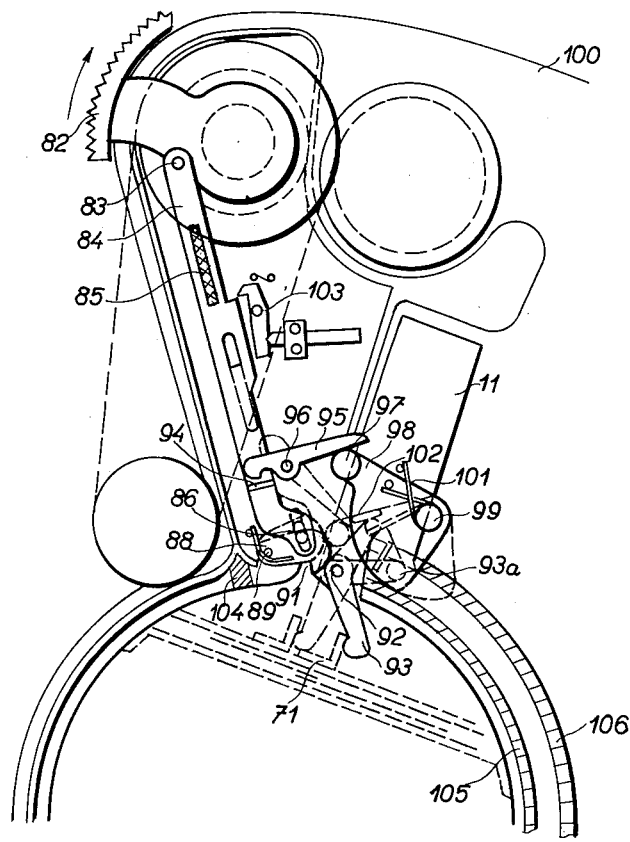
FIG. 6 is a view of parts of the release for the swivelling device of the objective cylinder, in the working position in which it is ready for taking a picture.

Details of the release of the swivelling device of the objective cylinder 1 are shown in FIG. 6. A rod 84, unidirectionally pulled by spring 85, is linked by a pin 83 to the manual release 82. The end of the rod 84 is provided with a cut-out 86 engaging the pin 87 of the pawl 88 pivoted on the bolt 89. Acted upon by a spring 90, the pawl 88 is pressed to jacket of the objective cylinder 1 which is fitted with a tooth 91 behind which the pawl can snap. Besides there is a lever 93 pivoted on the pin 92 of the objective cylinder which operates the stop 71 of the sector shaped shutter. The stop 94 placed upon the upper surface of the rod 84 cooperates with one arm of the two-arm lever 95 pivoted on a bolt 96 fastened to the housing 100. The other end of the lever 95 is in contact with a pin 97 of the segment 98 pivoted on a pin 99, fastened inside the housing 100. The segment 98 is unilaterally deviated by a spring 101 and its bottom surface carries a stop 102 which cooperates with the pin 93a of the lever 93. Double exposures are prevented by a pawl 103 which is connected with the mechanism (not shown) for advancing the sensitive film by one picture length. The extreme positions of the individual parts of the release device are indicated by dotted lines.

Figure 3:
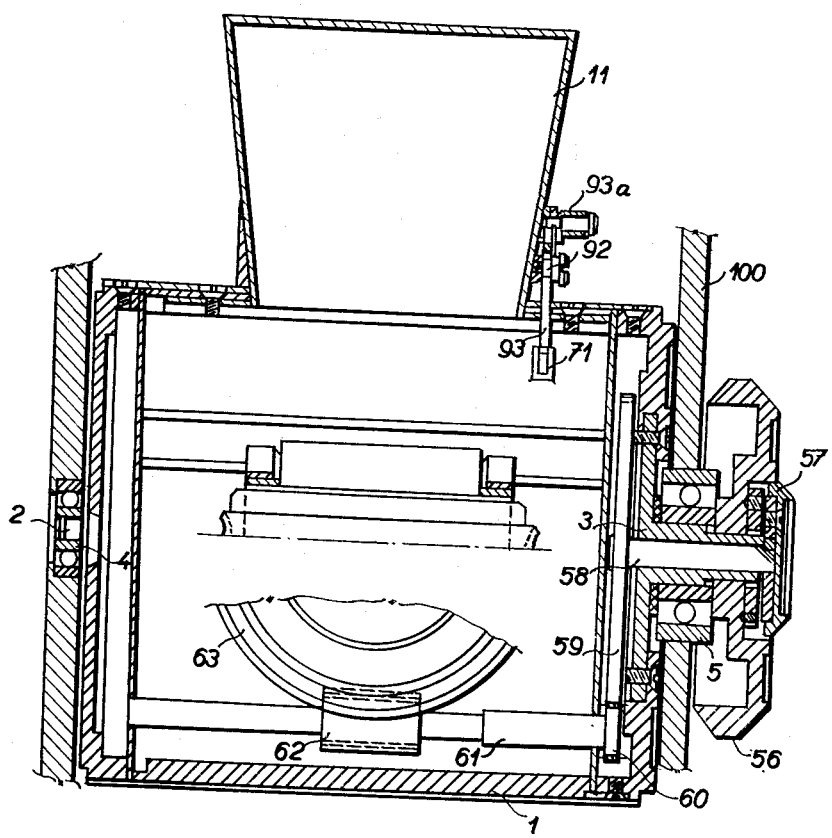
FIG. 3 shows cross sections through the objective cylinder in two planes at right angles to one another.
Figure 7:
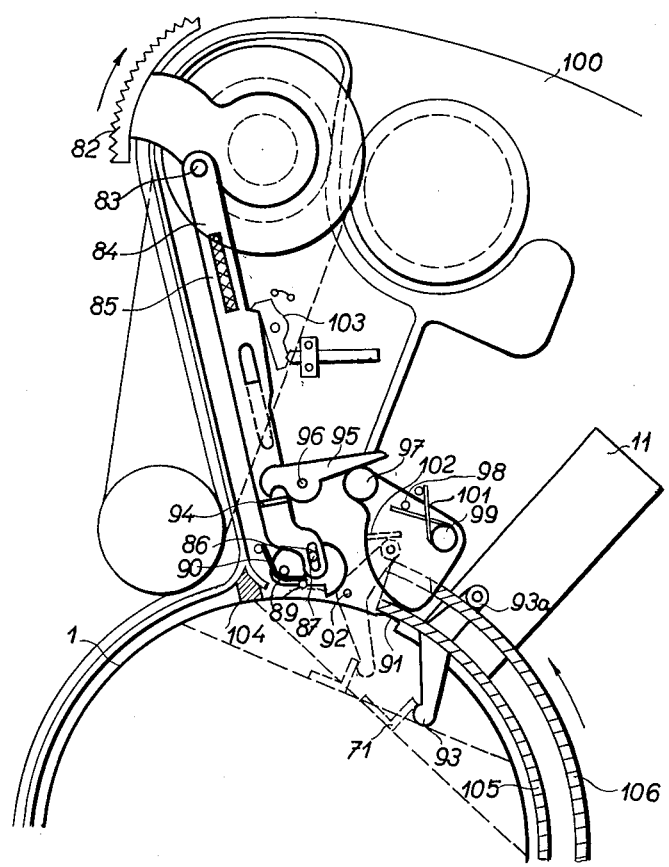
FIG. 7 is a view of parts of the release of the swivelling device of the objective cylinder when manually transferred to its working position.

The jacket of the objective cylinder is, inside the housing 1 of the panoramic camera, rendered light-tight by felt joints 104. Inside the housing 100, arranged coaxially with the objective cylinder 1, there are arched paths 105 and 106 which serve for opening and closing the double-sector shutter 10. The FIG. 7 illustrates parts of a release device of the same type as FIG. 6. In FIG. 7, the objective cylinder 1 is carried to its working position by means of the knob 56 (FIG. 3), the arrow indicating the direction of the movement.

The following is the function of the device for swivelling the objective cylinder 1:

Using knob 56, one turns the objective cylinder 1 in the direction indicated by the arrow (FIG. 7) whereby the pin 93a of the lever 93 glides along the upper surface of the arched path 106. During this rotation of the objective cylinder 1, the lever 93 is kept in such a position as not to act upon the stop 71 hence the sectors 78 and 79 of the shutter 10 remain closed. During this rotation, the flexible tape 12 rotates the roller 16 and winds up the driving spring 18. As soon as the objective cylinder reaches the end position of this rotation, the pawl 88 snaps behind the tooth 91 and the pin 93a hits the stop 102 swinging the lever 98 around the pin 99 in the position indicated by dotted lines in FIG. 6. After rewinding the sensitive film by a special mechanism (not shown in the drawings), the pawl 103 is deviated so as to disengage the rod 84. When moving the manual release 82 as indicated by the arrow, the rod 84 is displaced and the cut-out 86 catches the pin 87 deviating the pawl 88 which is pivoted on the pin 89. At the same time, the stop 94 swings out the two-arm lever 95, one arm of which cooperates with the pin 97 so as to deviate the segment 98. The stop 102 located upon the bottom surface of the segment 98 which cooperates with the pin 93a, swings out the lever 93 into the position indicated in FIG. 6 by dotted lines. By this, the lever 93 displaces the stop 71 in such a way as to open the sectors 78 and 79 of the shutter 10 and to free the way for the light rays, through the objective 7 to the sensitive film. Due to the action of spring 18 and of the flexible tape, the objective cylinder 1 starts turning on its ball bearings 4 and 5 while the pin 93a of the lever 93 glides along the arched path 105 which causes the sectors of the shutter 10 to remain open. After the termination of the swivelling motion of the objective cylinder 1—the pin 93a having terminated its movement along the arched path 105— the pawl 93 swings out and the stop 71 of the shutter 10 returns to its initial position, whereby the sectors 78 and 79 of the shutter 10 are closed. At the same time, the pawl 103 secures the rod of the swivelling device so as to prevent a double exposure to be taken upon the image field of the sensitive film.

I claim:

1. In a panoramic camera, the combination of a housing, an objective cylinder mounted at the front of said housing for rotation relative to the latter about the central axis of the cylinder and having means defining a path for light extending diametrically through the cylinder, an objective lens and shutter mounted in said cylinder and interposed in said path, rollers rotatably mounted within said housing at the opposite sides of said cylinder with their axes extending parallel to said axis of the cylinder, flexible tapes secured to said cylinder and wound on said rollers to form light seals between the portion of said housing in front of said tapes and the portion of the housing in back of said tapes, spring means in said rollers urging said cylinder to turn, by way of said tapes, to an extreme position, and means operative to turn said cylinder against the action of said spring means, thereby to load the latter for driving said cylinder back to said extreme position.

2. In a panoramic camera, the combination as in claim 1; further comprising a retarding device operatively connected to one of said rollers and exerting an adjustable braking force for controlling the speed of turning of said cylinder by said spring means.

3. In a panoramic camera, the combination as in claim 2; wherein said retarding device includes a plurality of rotatable fans, and drive means actuated by said one roller and selectively rotating said fans from the latter so that said braking force results from the air resistance to rotation of the fans rotated by said drive means.

4. In a panoramic camera, the combination as in claim 3, wherein each of said fans is rotatably mounted on an individual pivoted lever, and said drive means includes a drive gear for each fan rotatable about a fixed axis and a driven gear coaxial with the related fan and coupled to the latter for meshing engagement with the related drive gear in one position of the individual lever and for disengagement from said related drive gear when said individual pivoted lever is moved away from said related drive gear; and further comprising means selectively controlling the positions of each of said pivoted levers, thereby determining which of said fans are driven.

5. In a panoramic camera, the combination as in claim 4; wherein said means selectively controlling the positions of said pivoted levers includes rotatable cams corresponding to said pivoted levers and engaged by the latter, and manually actuable means for turning said cams.

6. In a panoramic camera, the combination as in claim 1, further comprising latch means operative to hold said cylinder at a second extreme position angularly displaced from the first mentioned extreme position, and latch release means operative to release said latch means and thereby permit turning of said cylinder by said spring means from said second extreme position to said first extreme position.

7. In a panoramic camera, the combination as in claim 6; wherein said shutter has open and closed positions, and means yieldably urging said shutter to said closed position; and further comprising shutter actuating means operative to open said shutter in response to operation of said latch release means with said cylinder in said second extreme position and to maintain the shutter in said open position during turning of said cylinder from said second extreme position to said first extreme position.

8. In a panoramic camera, the combination as in claim 7; wherein said shutter includes two pivoted sectors swingable toward and away from each other to said closed and open positions, respectively, lever means connecting said sectors to each other for joint swinging and acted upon by said means yieldably urging the shutter to said closed position, and a stop extending from said lever means; and wherein said shutter actuating means includes an actuating lever pivoted on said cylinder and having one end engageable with said stop, first and second arcuate cam tracks within said housing concentric with the axis of said cylinder and selectively engageable by the other end of said actuating lever to permit said shutter to remain in said closed condition and to displace said actuating lever so that said shutter is moved to said open position, respectively, and switch means operated by said latch release means when said cylinder is in said second extreme position to angularly displace said actuating lever from engagement of said other end of the latter with said first cam track to engagement with said second cam track.

9. In a panoramic camera, the combination as in claim 1; wherein said means operative to turn said cylinder against the action of said spring means includes a manually actuable knob rotatably coupled to said cylinder and disposed at the outside of said housing.

10. In a panoramic camera, the combination as in claim 9; further comprising an adjustable diaphragm in said objective cylinder, and means rotatable with said cylinder and operative to vary the size of the opening of said adjustable diaphragm including a control knob coaxial with said knob for turning the cylinder and being rotatable with respect to the latter.

References Cited in the file of this patent

UNITED STATES PATENTS 369,165     Connon _____ Aug. 30, 1887